(12) United States Patent
McCrosky et al.

(10) Patent No.: US 7,593,411 B2
(45) Date of Patent: Sep. 22, 2009

(54) BUS INTERFACE FOR TRANSFER OF MULTIPLE SONET/SDH RATES OVER A SERIAL BACKPLANE

(75) Inventors: Carl D. McCrosky, Saskatoon (CA); Bernard Guay, Vancouver (CA); Doug Konkin, Saskatoon (CA); Steven F. Lang, Vancouver (CA); Winston K. Mok, Vancouver (CA)

(73) Assignee: PMC-Sierra, Inc. (CA)

( * ) Notice: Subject to any disclaimer, the term of this patent is extended or adjusted under 35 U.S.C. 154(b) by 351 days.

(21) Appl. No.: 11/522,381

(22) Filed: Sep. 18, 2006

(65) Prior Publication Data

US 2007/0036173 A1    Feb. 15, 2007

Related U.S. Application Data

(63) Continuation-in-part of application No. 10/080,485, filed on Feb. 21, 2002, now abandoned.

(51) Int. Cl.
*H04L 12/28* (2006.01)

(52) U.S. Cl. .................................. 370/395.51; 370/469

(58) Field of Classification Search ....................... None
See application file for complete search history.

(56) References Cited

U.S. PATENT DOCUMENTS

| | | | | |
|---|---|---|---|---|
| 6,636,529 B1 * | 10/2003 | Goodman et al. | ........... | 370/469 |
| 6,782,009 B1 * | 8/2004 | Giorgetta et al. | ........... | 370/539 |
| 6,820,159 B2 * | 11/2004 | Mok et al. | .................. | 710/305 |
| 6,870,831 B2 * | 3/2005 | Hughes et al. | .............. | 370/352 |
| 7,180,913 B2 * | 2/2007 | Benvenuti et al. | ........... | 370/476 |
| 7,292,608 B1 * | 11/2007 | Nowell et al. | ............... | 370/506 |
| 2002/0080829 A1 * | 6/2002 | Ofek et al. | ................... | 370/539 |
| 2002/0154647 A1 * | 10/2002 | Potash | ........................ | 370/412 |

\* cited by examiner

*Primary Examiner*—Phirin Sam
(74) *Attorney, Agent, or Firm*—Vermette & Co.

(57) ABSTRACT

A bus interface for transfer of SONET/SDH data that supports a plurality of SONET/SDH flows. The invention supports two line coding schemes: 8B/10B encoding of STS-12, and SONET scrambled coding for STS-12, STS-48, and STS-51. The invention additionally supports two modes of line testing: entire links can be tested by inserting and checking PRBS sequences, and the SPE payload of the largest concatenated STS-Nc which the link can carry (STS-12c, STS-48c, STS-51c) can be individually tested by inserting and checking PRBS sequences.

19 Claims, 4 Drawing Sheets

| Code Group Name | Curr. RD- abcdei fghj | Curr. RD+ abcdei fghj | Substituted Value / Purpose / Equivalent Parallel TeleCombus control bytes and signals |
|---|---|---|---|
| Multiplex Section Termination (MST) Level Control Characters | | | |
| K28.5 | b001111 1010 | b110000 0101 | b00000000<br>Transport Frame Alignment<br>IJ0 = 1 and IPL = 0 |
| K28.4- | b001111 0010 | - | b00000001<br>High-order path AIS<br>IPAIS = 1 |
| High-Order Path Termination (HPT) Level Control Characters | | | |
| K28.6 | b001111 0110 | b110000 1001 | b00000010<br>High-order path frame alignment<br>IJ1 = 1 and IPL = 1 |
| K28.0- | b001111 0100 | - | b00000011<br>High-order path H3 byte, no negative justification event<br>ID = H3 position and IPL = 0 |
| K28.0+ | - | b110000 1011 | b00000100<br>High-order path PSO byte, positive justification event<br>ID = PSO position and IPL = 0 |
| Low-Order path Termination (LPT) Level Control Characters | | | |
| K28.4+ | - | b110000 1101 | b00000101<br>Low-order path AIS<br>IVAIS = 1 |
| K27.7- | b110110 1000 | - | b00000110<br>Low order path frame alignment<br>IV5 = 1 and ID[5,0,4] = 'b000<br>ERDI[1:0] = 'b00, REI = 'b0, ERDI[1:0] and REI are encoded in the V5 byte. |
| K27.7+ | - | b001001 0111 | b00000111<br>Low order path frame alignment |

FIG. 2A

| | | | |
|---|---|---|---|
| | | | IV5 = 1 and ID[5,0,4] = 'b100 ERDI[1:0] = 'b00, REI = 'b1, ERDI[1:0] and REI are encoded in the V5 byte. |
| K28.7- | b001111 1000 | - | b00001000<br>Low-order path frame alignment<br>ERDI[1:0] = 'b01, REI = 'b0, ERDI[1:0] and REI are encoded in the V5 byte. |
| K28.7+ | - | b110000 0111 | b00001001<br>Low order path frame alignment<br>IV5 = 1 and ID[5,0,4] = 'b101 ERDI[1:0] = 'b01, REI = 'b0, ERDI[1:0] and REI are encoded in the V5 byte. |
| K29.7- | b101110 1000 | - | b00001010<br>Low order path frame alignment<br>IV5 = 1 and ID[5,0,4] = 'b010 ERDI[1:0] = 'b10, REI = 'b0, ERDI[1:0] and REI are encoded in the V5 byte. |
| K29.7+ | - | b010001 0111 | b00001011<br>Low order path frame alignment<br>IV5 = 1 and ID[5,0,4] = 'b010 ERDI[1:0] = 'b10, REI = 'b1, ERDI[1:0] and REI are encoded in the V5 byte. |
| K30.7- | b011110 1000 | - | b00001100<br>Low order path frame alignment<br>IV5 = 1 and ID[5,0,4] = 'b011 ERDI[1:0] = 'b11, REI = 'b0, ERDI[1:0] and REI are encoded in the V5 byte. |
| K30.7+ | - | b100001 0111 | b00001101<br>Low order path frame alignment<br>IV5 = 1 and ID[5,0,4] = 'b111 ERDI[1:0] = 'b11, REI = 'b1, ERDI[1:0] and REI are encoded in the V5 byte. |
| K23.7 | b111010 1000 | b000101 0111 | b00001110<br>Non low-order path payload bytes<br>ITPL = 0 |
| Characters that Generate a Line Code Violation | | | |
| LCV | - | - | b00001111 |

FIG. 2B ated PRBS sequences.

BUS INTERFACE FOR TRANSFER OF MULTIPLE SONET/SDH RATES OVER A SERIAL BACKPLANE

This application is a continuation-in-part of U.S. patent application Ser. No. 10/080,485 filed Feb. 21, 2002 now abandoned.

FIELD

This invention relates generally to a bus interface used to transfer SONET/SDH data. More specifically, this invention relates to a bus interface for the transfer of multiple SONET/SDH data rates over a serial backplane.

BACKGROUND OF THE INVENTION

In conventional data communication systems a local node with a large number of SONET/SDH terminations may process a large variety of payload types. Common payloads are Asynchronous Transfer Mode (ATM), Packet Over SONET (POS), and Time Division Multiplexing (TDM) traffic. In general, each of the payload types is processed by specialized hardware residing in disparate cards. For traffic not terminating in the local node, the traffic may be groomed and transported from input fibers to arbitrary output fibers.

The Combus standard provides a common interface between SONET termination devices and payload processing devices. However, the Combus standard is limited to OC-3 streams and contains 11 signals per interface. For a high capacity node, the number of signals required typically exceeds the limits of the Combus standard.

Another existing approach to connecting SONET/SDH termination devices to payload processing devices requires the reconstruction of a serial SONET/SDH stream post SONET/SDH termination. However, this method suffers from the disadvantage of requiring duplicate SONET/SDH processing at the payload processing devices.

It is an object of this invention to provide an improved serial bus interface to connect SONET/SDH termination devices with payload processing devices, across system backplanes.

It is a further object of this invention to provide a bus interface to connect SONET/SDH termination devices with payload processing devices utilizing a minimum number of signals.

It is still a further object of this invention to provide a bus interface that can scale with future advances in bandwidth in serial link technology.

It is a further object of this invention to support multiple SONET/SDH line rates. In particular STS-12 is to be supported at 622.08 Mb/s, STS-48 is to be supported at 2488.32 Mb/s and STS-51 (a custom extension to the SONET/SDH standards) is to be supported at 2643.84 Mb/s.

It is a further object of this invention to support two line coding schemes: 8B/10B encoding of STS-12 at 622.08 Mb/s producing an effective line rate of 777.6 Mb/s, and SONET scrambled coding for all three rates (STS-12, STS-48, and STS-51) with no expansion in effective line rates.

It is a further object of this invention to support two modes of line testing: entire links can be tested by inserting and checking PRBS sequences, and the SPE payload of the largest concatenated STS-Nc which the link can carry (STS-12c, STS-48c, STS-51c) can be individually tested by inserting and checking PRBS sequences.

It is a final object of this invention to support diagnostic line testing by inserting B1 framing errors at the transmitter, to be checked at the receiver.

SUMMARY OF THE INVENTION

These and other objects of the invention are provided in a new and improved bus interface for connecting SONET/SDH termination devices with payload processing devices while requiring a minimum number of signals. The bus interface allows a SONET/SDH termination device to handoff at the SONET line termination level, path termination level, and tributary termination level (SDH multiplex section termination level, high-order path terminating level and low-order path terminating level). The interface is also capable of scaling with future advances in bandwidth in serial link technology.

The bus interface of the present invention supports the following SONET/SDH flows: an 8B/10B solution for STS-12 (777.6 Mb/s), and scrambled SONET/SDH for STS-12 (622.08 Mb/s), STS-48 (2488.32 Mb/s), and STS-51 (2643.84 Mb/s). Each such SONET/SDH flow can be transmitted in duplex over a single pair of differential traces in each direction. The differential signaling techniques used may be based on LVDS-like electrical parameters and the power consumed by the implementation should be minimized. The bus interface includes options for manipulation of SONET/SDH Section, Line, and Path overhead octets, and additionally supports line testing via PRBS techniques.

Each receiver of the bus interface can find bit, byte, and SONET frame alignment. In an embodiment of the bus interface with multiple receivers, the bus interface is capable of finding a mutual alignment of the frames on all receivers and dividing its receivers into groups, which achieve separate mutual alignments. In addition, the receivers can support a sufficient depth of FIFO to allow incoming signals in the same mutual alignment group to have differential delay on their paths, to allow some signals to entirely skip space-switching stages, while other mutually aligned signals pass through the space-switching stage.

The bus interface of the present invention comprises a transmitter module and a receiver module. The transmitter module either 8B/10B encodes or S-NRZ scrambles before serializing and transmitting the SONET/SDH frames, which may be partially compliant. The receiver recovers bit boundaries then either uses 8B/10B coding to find byte alignment and 8B/10B control characters to find SONET framing, or uses SONET/SDH A1/A2 frame delineation to find both byte and frame boundaries.

The 8B/10B control characters labeling the SONET/SDH frame boundaries are decoded into SONET/SDH control signals.

By mapping a descrambled SONET/SDH data stream into 8B/10B control characters, proper data transitions on serial links can be ensured. Also, the mapping preserves the DC balance.

Preferably, the 8B/10B control characters that have an even number of ones and zeros have their positive and negative disparity codes treated as separate control characters. Line code violations of these 8B/10B characters may be used to monitor error performance of serial links.

Alternatively, the signal may be scrambled using standard SONET/SDH scrambling with the $x^7+x^6+1$ scrambling polynomial. This option avoids expanding the required serial link bandwidth (8B/10B requires $10/8=1.25$ times the basic SONET/SDH bandwidth). This advantage translates into lower power consumption and greater reach for a lower frequency signal. However, the scrambling option does introduce the possibility that the scrambler will generate a sufficiently long sequence of unchanging bits that the LVDS links will lose bit alignment. The underlying LVDS technology is tolerant of transitionless runs of up to 80 bits. This drives the probability of loss of bit alignment to acceptably low levels.

The transmitter blocks also compute the SONET/SDH standard BIP code over each frame, and insert the resultant parity bits in the B1 TOH position. The receiver blocks recompute the BIP code and check it against the contents of B1. To simplify testing, the transmitter is capable of forcing a false BIP error into B1, which the receiver should then expect.

The current application does not increase the rate of the data stream. Existing bytes in the data stream are advantageously replaced by 8b/10b k-characters where appropriate. Since the bit error performance is a function of data rate, not having an increase is beneficial to system performance. Also, the current invention uses the existence of control characters to signal boundaries. In fact, the current invention uses different control characters to signal different classes of frame boundaries.

The present framer examines only a sub-set of A1/A2 bytes namely, the last 3 A1 and the first 3 A2 bytes. The remaining A1 and A2 bytes are available for other uses.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

Many objects and advantages of the present invention will be apparent to those of ordinary skill in the art when this specification is read in conjunction with the attached drawings wherein like reference numerals are applied to like elements and wherein:

FIG. 2A is a table containing RSEF Output Data for Tele-Combus Ctrl Characters and LCVs;

FIG. 2B is a continuation of the table of FIG. 2A;

DETAILED DESCRIPTION

Figure 1:
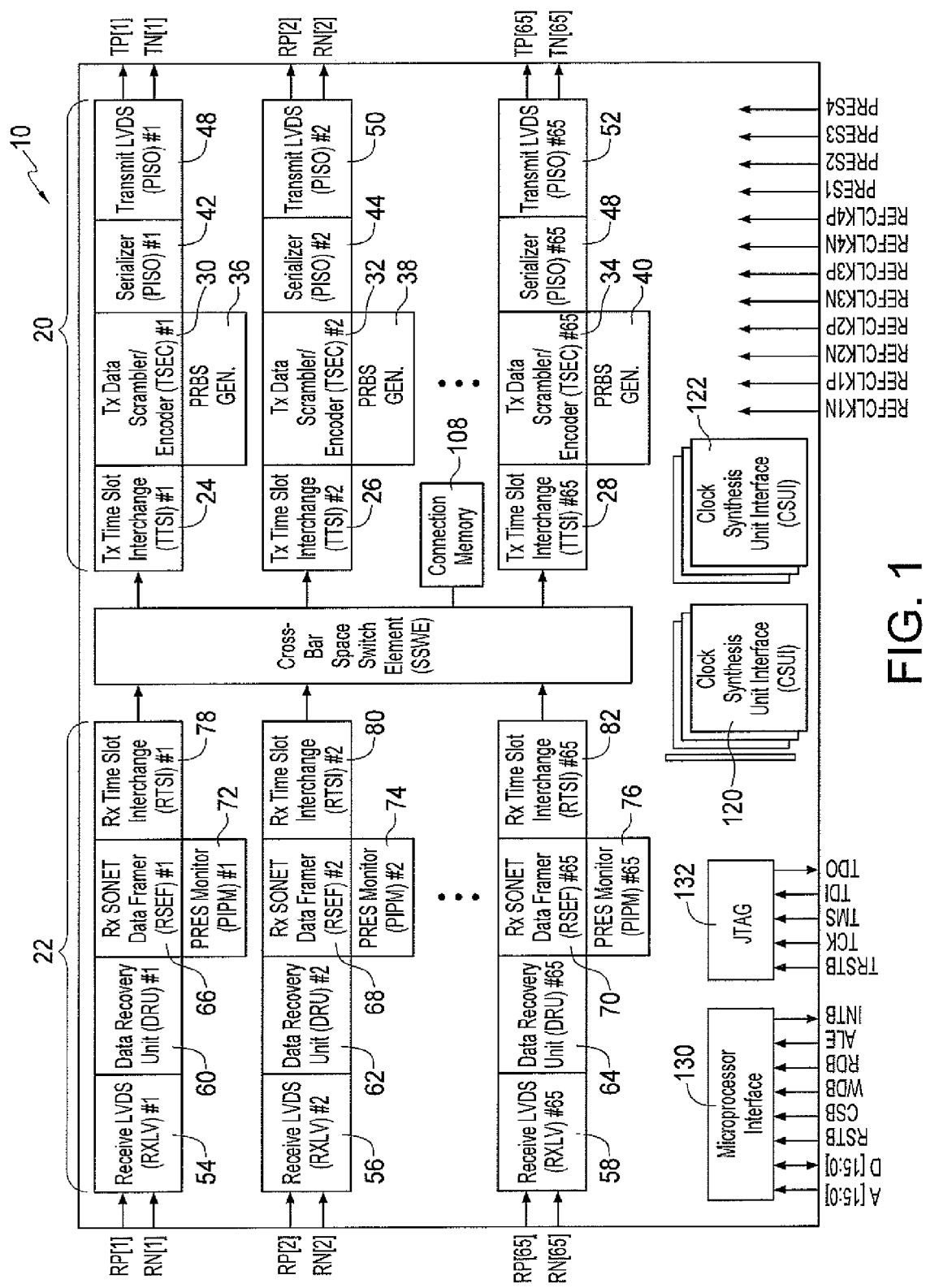
FIG. 1 is a schematic block diagram depicting an embodiment of the bus interface, in the context of a time division multiplexing switch which switches STS-1s among multiple SONET/SDH signals; the switch application is included only to illustrate a common use of these serial SONET/SDH links.

Referring to FIG. 1, an embodiment of the bus interface 10 is depicted. The transmit module 20 is comprised of Transmit Data Scrambler/Encoder (TSEC) blocks 30, 32, and 34, respectively, Pseudo-Random Bit Sequence generators 36, 38, and 40, Serializer (PISO) blocks 42, 44 and 46, respectively, and Transmit LVDS (TXLV) blocks 48, 50 and 52, respectively.

The receive module 22 is comprised of Receive LVDS (RXLV) blocks 54, 56, and 58, Data Recovery Units (DRU) 60, 62, and 64, Receive SONET Data Framer (RSEF) blocks 66, 68, and 70, PRBS monitor (PIPM) blocks 72, 74, and 76.

FIG. 1 shows the use of the serial link technology which is the subject of this patent in a typical application. The application is an STS-1 granular time division multiplexing switch. The switching application is supported by the Transmit Time-slot Interchange (TTSI) blocks 24, 26 and 28, respectively, the Receive Time Slot Interchange (RTSI) blocks 78, 80, and 82, the Cross-Bar Space Switch Element (SSWE) 84, and the Connection Memory 108. The Microprocessor Interface 130 provides software access to all other blocks. The JTAG block 132 provides testing facilities for the overall chip. There are many other applications of this serial link technology.

Transmit Data Scrambler/Encoder (TSEC)

Figure 3:
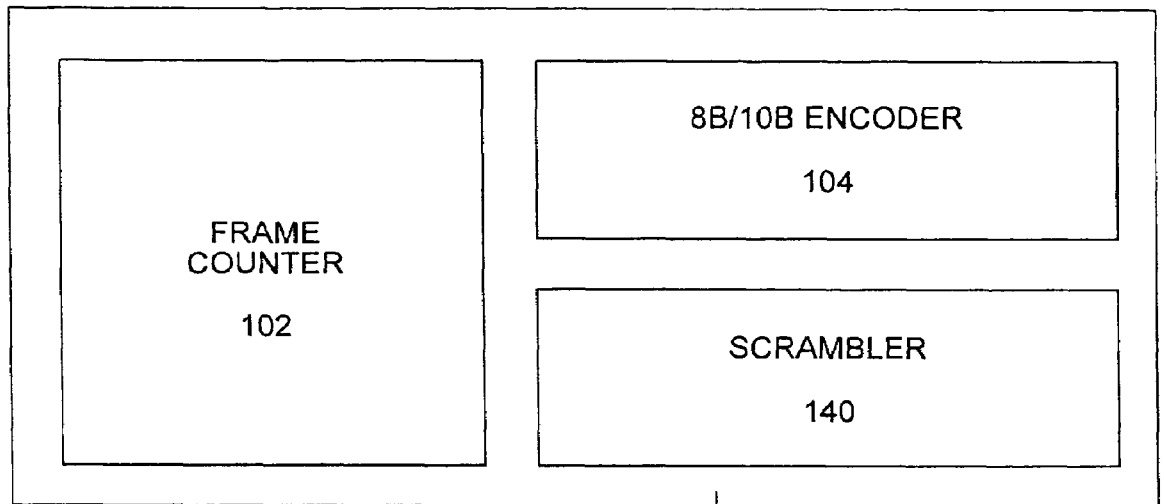
FIG. 3 is a block diagram depicting an embodiment of a transmit data scrambler/encoder (TSEC) block.

The TSEC blocks 30, 32, 34 convert the internal data representation to the selected external serial transmission format. If configured for emission of scrambled data, the TSEC applies SONET/SDH scrambling to the data stream. Referring to FIG. 3, the frame counter 102, 8B/10B Encoder 104 and the scrambler 140 function to count and thus identify the bytes in the frames to be transmitted, apply 8B/10B encoding or scramble the octets. The scrambling is accomplished with the $x^7+x^6+1$ scrambling polynomial applied to all SONET/SDH octets other than A1, A2, and J0/Z0. This scrambler restarts each SONET/SDH frame. Alternately, the TSEC can be configured for the emission of a Serial Telecom-Bus datastream in which the datastream is encoded using the 8B/10B based Serial TelecomBus format.

Serial TelecomBus differs from 8B/10B in that it permits the emission of specific incorrect disparity control characters that would normally result in a line code violation at the 8B/10B receiver. The exceptional control characters (and disparities) are as follows: K28.0−, K28.0+, K28.4−, K28.4+, K27.7−, K27.7+, K28.7−, K28.7+, K29.7−, K29.7+, K30.7−, K30.7+.

The TSEC can be configured to overwrite the datastream with a pseudo random bit sequence (PRBS) onto the SONET/SDH frames. The PRBSed bytes exclude the path overhead and fixed stuff bytes of the SPE. Overwriting all words with 8 or 10 bit PRBS data, depending on PISO interface width, enables a raw PRBS mode for serial line testing. The TSEC supports PRBS generation of concatenated SONET/SDH streams at the line rate: STS-12c, STS-48c, or STS-51c. The STS-Nc SPE payload is fixed inside the transport frame with the J1 following the H3 bytes (active offset of 0). The PRBS polynomial used is $x^{23}+x^{18}+1$.

The TSEC block 30, 32, 34 computes the standard SONET/SDH BIP code and inserts the resultant parity bits into the standard B1 TOH location. Under software control, TSEC is also capable of deliberately inserting an incorrect BIP code.

A total of 65 TSEC blocks are instantiated in the embodiment disclosed in FIG. 1.

PRBS Generator

The PRBS Generator blocks 36, 38, and 40 optionally insert a PRBS pattern on a per STS-1/STM-0 basis onto the Outgoing TeleCombus stream. Each PRBS Generator block has the capacity to source PRBS data of an STS-12/STM-4 stream. A set of four PRBS blocks may be connected in tandem to service an STS-48c/STM-16-16c stream.

Transmit Serialiser

The Parallel Data In, Serial Data Out (PISO) blocks 42, 44, 46 are analog blocks that serialize the output datastream prior to its transmission by the TXLV blocks 48, 50, 52. The PISO accepts 8 or 10-bit characters and converts them to a serial bit stream at the selected baud rate.

The PISO blocks have three modes: 10-bit, Scrambled NRZ, and Half Rate mode. 10-bit and Scrambled NRZ modes are mutually exclusive.

In 10-Bit Mode, the PISO block divides the transmit serial clock generated from the Clock Synthesis Unit (CSU) 122 by 10, uses the divided clock to clock in 10 bit parallel data, and outputs the serial data at the transmit serial clock rate. The 10-Bit mode PISO configuration supports the links configured for 777.6 Gbit/s Serial TelecomBus operation.

In Scrambled NRZ mode, the PISO divides the transmit serial clock generated from the CSU 122 by 8, uses the divided clock to clock in 8 bit parallel data and outputs the serial data at the transmit serial clock rate. The scrambled NRZ mode PISO configuration supports the links configured for 622 Mbit/s and 2.488 or 2.643 Gbit/s operation.

In Half Rate mode, the PISO accepts half the bits of the designated word width, and outputs each bit twice at the transmit serial clock. This mode can be used in conjunction with 10-Bit mode or Scrambled NRZ mode. Half Rate mode PISO configuration supports the links configured for either 622 or 777.6 Mbit/s operation.

A total of 65 PISO blocks are instantiated in the embodiment disclosed in FIG. 1.

LVDS Transmitter

The LVDS Transmitters 48, 50, and 52 (TXLV blocks) convert 8B/10B encoded digital bit-serial streams to LVDS signaling levels.

High speed output data is driven differentially by the TXLV blocks, and may directly drive optical, cable, or pc-board interconnects. The High Speed 2.643 ELVDS line driver is designed to transmit data at a maximum rate of 2.643 Gbit/s over controlled impedance lines (50 ohms). The TXLV is capable of transmitting up to 2.643 Gbit/s over 40 inches of FR4. It provides both differential outputs and an on-chip differential termination (100 ohms differential).

For backplanes implemented with FR4 or similar materials, significant dielectric losses will occur. These losses are frequency dependent and severely limit the achievable separation between transmitter and receiver. To mitigate this problem, the device offers optional output de-emphasis. The de-emphasis circuit drives the output more strongly when the data sequence contains high-frequency information.

Also included is a low-power mode, which halves the amplitude for shorter reach (sub 6") applications.

A total of 65 TXLV blocks are instantiated in the embodiment disclosed in FIG. 1.

Clock Synthesis Unit

The Clock Synthesis Unit (CSU) block 122 generates the various clock frequencies for the transmit and receive LVDS links, for the different line coding and SONET/SDH data rate options.

The clock synthesis unit uses a PLL to synthesize a baud clock from the clock reference inputs. The baud clock is used to transmit serial data on all channels. No external components are required by the PLL other than a precision resistor on the precision resistor terminals. The baud clock frequency may be varied over a range of 0.62208 GHz to 2.64384 GHz. The PLL has four fixed multiplication ratios of 4, 5, 16, and 17, to accommodate the supported baud rates of 0.62208, 0.7776, 2.48832, and 2.64384 Gbit/s respectively from a REFCLK frequency of 155.52 MHz. The PLL can also be configured for a baud rate of 0.7776 Gbit/s from a REFCLK frequency of 77.76 MHz. A clock output is provided for operating the internal logic of the device.

A total of 4 CSUs are instantiated in the embodiment disclosed in FIG. 1, one for each face.

The clock synthesis unit interface (CSUI) 120 provides an interface to set control and access status information for the CSU 122. It also provides additional per face control for the PISOs, DRUs, TXLVs, and RXLVs, on the corresponding face. The CSUI 122 also generates a core clock with a rate dependent on the core time slot mode.

Four CSUIs 120 are instantiated in the embodiment disclosed in FIG. 1, one for each CSU 122.

Receive Module

The receive module 22 is comprised of Receive LVDS Interface (RXLV) blocks 54, 56, and 58, Data Recovery Units (DRU) 60, 62 and 64, Receive SONET Data Framer (RSEF) blocks 66, 68 and 70, and PRBS Monitors (PIPM) 72, 74 and 76

Receive LVDS Interface (RXLV)

The RXLV blocks 54, 56, and 58 convert LVDS signaling levels to digital bit-serial streams.

The RXLV blocks are 2.64384 Gb/s Enhanced Low Voltage Differential Signaling (ELVDS) receivers. Together with the TXLV blocks 48, 50, 52, the RXLV blocks 54, 56, 58, form complete 2.64384 Gbit/s point-to-point ELVDS links. The ELVDS specification accommodates both AC and DC coupled receiver inputs.

Data Recovery Units

The Data Recovery Unit (DRU) blocks 60, 62, 64 monitor the RXLV links for transitions to determine the extent of bit cycles on the link. They then adjust their internal timing to sample the links in the middle of the data "eye". The DRU blocks 60, 62, 64 also convert the bit serial streams into 10-bit words. The words are constructed from ten consecutive received bits without regard to 8B/10B character boundaries.

Each Clock and Data Recovery Unit (DRU) is an analog block that recovers clock and data from a serial data stream, deserializes the data, and outputs the parallel data with a synchronized low speed clock.

A baud-rate receive clock is extracted from the transition rich serial data stream independently on each channel. The data rate of the transmitted serial bit stream must be frequency locked to the REFCLK clock signals. Transitions in the data are used to steer sampling towards the center of the eye.

Each DRU has three modes: 10-bit, Scrambled NRZ, and Half Rate mode. 10-bit and Scrambled NRZ modes are mutually exclusive.

In 10-Bit mode, the DRU converts the serial data to a 10-bit word and outputs the parallel data at $\frac{1}{10}^{th}$ of the serial data rate with the synchronized clock. 10-Bit mode DRU configuration supports the links configured for 777.6 Mbit/s Serial TelecomBus operation.

In Scrambled NRZ mode, the DRU expects a "Scrambled NRZ" serial data stream. In Scrambled NRZ mode the DRU will convert the serial data to an 8-bit word and outputs the parallel data at $\frac{1}{8}^{th}$ of the serial data rate with the synchronized clock. Scrambled NRZ mode DRU configuration supports the links configured for 622.08 Mbit/s and 2.48832 or 2.64384 Gbit/s operation.

In Half Rate mode, the DRU recovers serial data stream at half rate of the CSU provided clocks. This mode can be used in conjunction with 10-Bit Mode or Scrambled NRZ Mode. Half Rate mode DRU configuration supports the links configured for either 622.08 or 777.6 Mbit/s operation.

A total of 65 DRU blocks are instantiated in the embodiment disclosed in FIG. 1.

Receive SONET Data Framer (RSEF)

The Receive SONET Data Framer (RSEF) blocks 66, 68, 72 frame to the receive stream to find 8B/10B character boundaries. They also contain a FIFO to bridge between the timing domain of the RSEF links and the system clock timing domain.

Each RSEF block performs character alignment and frame alignment on an unaligned SONET/SDH datastream received from the DRU block.

Each RSEF block recovers character and frame alignment in two modes: Serial TelecomBus encoded data, and scrambled data. Serial TelecomBus encoding is based on 8B/10B encoding except that it permits the emission of specific incorrect disparity control characters that would normally result in a line code violation at the 8B/10B receiver. Referring to FIGS. 2A and 2B, the exceptional control characters (and disparities) are as follows: K28.0−, K28.0+, K28.4−, K28.4+, K27.7−, K27.7+, K28.7−, K28.7+, K29.7−, K29.7+, K30.7−, K30.7+.

In Serial TelecomBus mode, the RSEF recovers character alignment by searching for the 8B/10B K28.5 frame alignment control character, which is used to identify the J0 position of the SONET/SDH frame. When the RSEF is out of character alignment, it is also necessarily out of frame alignment. When the RSEF is out of character alignment, the first K28.5 character found will determine the character alignment and transition the RSEF into the character alignment state. A count of line code violations (LCVs), either unrecognized 8B/10B characters or incorrect disparity characters, is maintained. If the number of LCVs within a window of 15 received characters exceeds a threshold of 4, frame and character alignment is lost and the block attempts to reframe on the next J0 character. To find frame alignment, the RSEF must locate two K28.5 characters at the correct position with respect to each other, separated by 9720 bytes, regardless of whether the RSEF is currently character aligned or not. To go out of frame, the RSEF must either go out of character alignment or encounter four instances of K28.5 characters not in the J0 position of the current frame alignment and uninterrupted by an instance of a J0 being in the correct position.

Additionally, in this mode, the 8B/10B datastream is decoded into an internal format of 8-bits data and 1-bit control.

In scrambled mode, the RSEF block performs character and frame alignment on the incoming scrambled datastream based on the SONET/SDH A1/A2 framing pattern. The RSEF achieves character alignment on detecting a pattern of 3 A1 characters followed by 3 A2 characters. Upon character alignment, frame alignment is attained once the RSEF detects an A1 character at the first timeslot and the first 4 bits of the A2 character at the last A2 timeslot, based on the alignment predicted by the character aligner. Four consecutive errors in detecting the A1/A2 pattern above will result in loss of frame and character alignment. Following framing, the datastream is descrambled. The resultant stream is mapped into 8 bits data, and 1 bit control to achieve uniformity of output data with the RSEFs receiving Serial TelecomBus.

Character and frame alignment state can be monitored through the MPIF (Microprocessor Interface) 130. Additionally, the microprocessor can force the RSEF out of either character and/or frame alignment.

The RSEF also performs block-based bit interleaved parity (BIP-8) checking on the B1 byte in the SONET/SDH frame following character and frame alignment. An interrupt indication and B1 error count allow monitoring of the B1 status, regardless of character and frame alignment state. The B1 error count is only valid for unencoded data.

The RSEF provides control for the input replication feature. Except for the 65$^{th}$ channel, all Receive channels are paired such that an odd channel is paired with the next even channel. If input port replication is enabled for an even RSEF, it selects the odd channel in the pair as its data source. If input port replication is enabled for an odd RSEF, it selects the even channel in the pair as its data source. If input port replication is not enabled, the RSEF selects its own channel as its data source. Input port replication is enabled on a per channel basis.

The RSEF provides control to mask K28.5 characters in the datastream. These characters are seen in Serial TelecomBus datastreams. If they are not masked, then the time slot interchange blocks have to be configured to prevent J0/Z0 reordering. Masking K28.5 characters at the RSEF and reinserting them at the J0 position for TSECs configured for Serial TelecomBus allows J0/Z0 switching.

The RSEF also provides control for line code violation propagation on receive datastreams. If line code violation propagation is enabled, a special character is inserted into the datastream which is mapped to a line code violation by configured TSECs.

A total of 65 RSEF blocks are instantiated in the embodiment disclosed in FIG. 1.

Figure 4:
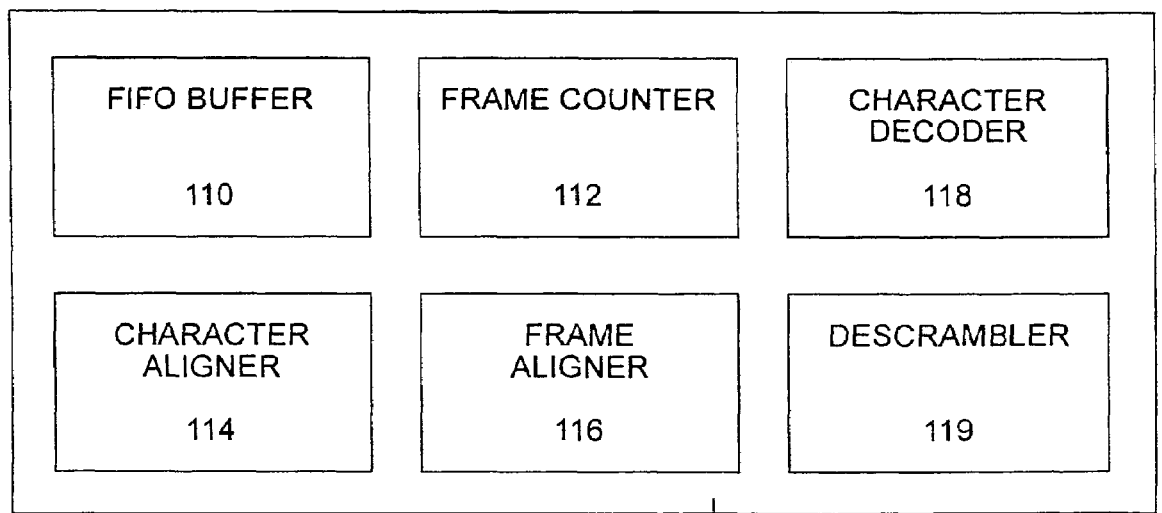
FIG. 4 is a block diagram depicting an embodiment of a receive SONET data framer (RSEF) block.

Referring to FIG. 4, each of the RSEF blocks 66, 68, 70, includes a FIFO buffer 110, a Frame Counter 112, a Character Aligner 114, a Frame Aligner 116, a Character Decoder 118, and a Descrambler 150.

FIFO Buffer

The FIFO buffer 110 provides isolation between the timing domain of the associated receive LVDS link (RXLV) and that of the system clock (SYSCLK). Data with arbitrary alignment to 8B/10B characters are written into a 10-bit by 24-word deep FIFO buffer 110 at the link clock rate. Data is read from the FIFO buffer 110 at every SYSCLK cycle.

Frame Counter

The Frame Counter 112 keeps track of the octet identity of the outgoing data stream. It is initialized by a delayed version of the RJOFP signal. It identifies the positive stuff opportunity (PSO) and negative stuff opportunity (H3) bytes within the transport frame so that high-order path pointer justification events can be identified and decoded.

Character Aligner

The Character Aligner 114 locates character boundaries in the incoming 8B/10B data stream. The framer logic may be in one of two states, SYNC state and HUNT state. It uses the 8B/10B control character (K28.5) used to encode the SONET/SDH J0 byte to locate character boundaries and to enter the SYNC state. It monitors the receive data stream for line code violations (LCV). An LCV is declared when the running disparity of the receive data is not consistent with the previous character or the data is not one of the characters defined in IEEE std. 802.3. Excessive LCVs are used to transition the framer logic to the HUNT state.

Normal operation occurs when the character aligner 114 is in the SYNC state. 8B/10B characters are extracted from the FIFO buffer 110 using the character alignment of the K28.5 character that caused entry to the SYNC state. Mimic K28.5 characters at other alignments are ignored. The receive data is constantly monitored for line code violations. If 5 or more LCVs are detected in a window of 15 characters, the character aligner transitions to the HUNT state. It will search all possible alignments in the receive data for the K28.5 character. In the mean time, the original character alignment is maintained until a K28.5 character is found. At that point, the character alignment is moved to this new location and the character aligner transitions to the SYNC state.

Frame Aligner

The frame aligner 116 monitors the data read from the FIFO buffer 110 for the J0 byte. When the frame counter 112 indicates the J0 byte position, a J0 character is expected to be read from the FIFO buffer 110. If a J0 byte is read out of the FIFO buffer 110 at other byte positions, a J0 byte error counter is incremented. When the counter reaches a count of 3, the frame aligner 116 transitions to the HUNT state. The next time a J0 character is read from the FIFO buffer 110, the associated read address is latched and the frame aligner 116 transitions back to the SYNC state. The J0 byte error counter is cleared when a J0 byte is read from the FIFO buffer 110 at the expected position.

Character Decoder

The character decoder 118 decodes the incoming 8B/10B control characters into an extended set of TeleCombus control signals. FIGS. 2A and 2B show the mapping of 8B/10B control characters into TeleCombus control signals.

Descrambler

The standard SONET/SDH descrambler 119 can optionally recover the original SONET/SDH data stream from the scrambled form transmitted on the serial differential pair. This block finds SONET/SDH frame boundaries by examining the unscrambled A1 and A2 octets, which indicate both byte and frame boundaries. The descrambler then begins applying the $x^7+x^6+1$ polynomial to the first octet after the last Z0 in each frame, with the descrambler reinitialized at the start of each frame.

Receive PRBS Monitor (PIPM)

The Receive PRBS Monitor (PIPM) blocks 72, 74 and 76 provide in-service and off-line diagnostics of the receive LVDS links.

The PRBS Monitor (PIPM) contains a simplified pointer interpreter that identifies the J1 position in the concatenated SONET/SDH payloads and follows pointer justification events. A frame pulse indicates the start of the SPE to the PRBS monitor. The PIPM also provides PRBS monitoring for concatenated SONET/SDH payloads. The PIPM can be configured to determine J1 position using the Serial TelecomBus pointer position control characters (K28.0−, K28.0+, and K28.6). This mode can only be used when the data was Serial TeleCombus encoded at the High-order Path Termination (HPT) level. Pointer interpreter mode is selected using the Register MN40H: PIPM Configuration and Status MON_MODE bit.

The PIPM pointer interpreter does not implement the full specification for SONET/SDH pointer processing. Particularly, error conditions (AIS, LOP) are ignored, since the PIPM pointer interpreter assumes that the frames containing PRBS will be correctly formatted. The fundamental operations (new pointer value during normal operation, new data flag, increment and decrement) are fully implemented according to ANSI T1.105-1995.

The PIPM supports PRBS monitoring of the concatenated SONET/SDH streams STS-Nc payload capacity at the line rates: STS-12c/C-4-4c, STS-48c/C-4-16, and STS-51c/C-4-17c. The STS-Nc SPE/VC-4-Xc payload is floating inside the transport frame, so the PIPM must identify the J1 position in order to locate the STS-Nc payload capacity/C-4-Xc.

The incoming PRBS data is tested against the $X^{23}+X^{18}+1$ polynomial. The PRBS data is optionally inverted before being checked.

The PRBS monitoring process consists of two steps. First, the monitor LFSR is synchronized with the incoming PRBS data. Second, the LFSR is used to generate subsequent expected PRBS words and to compare them with the incoming PRBS words. If the expected and received words are not equal, then a mismatch error is detected in that word. Mismatch errors are counted while the monitor is synchronized with the incoming stream. Mismatch errors optionally result in the generation of an interrupt. The monitor mismatch error counter does not count bit errors since multiple bit errors in a byte will be considered as a single byte error. Four consecutive byte errors will force the monitor out of synchronization. The current synchronization state is available through the microprocessor interface. A change in the synchronization state will also generate an interrupt.

Synchronization begins by loading the LFSR with consecutive bits from the incoming PRBS pattern. This requires three bytes of data. If the next 4 bytes generated by the LFSR after it is loaded match the incoming bytes, then the monitor is considered synchronized. If a mismatch occurs, then the monitor remains unsynchronized and continues to attempt to synchronize by repeating this process with the next bytes in the datastream.

The PIPM will not synchronize to the input PRBS data if the data is a sequence of either all 0 bits or all 1 bits The monitor will check specifically for this case and will not synchronize to it.

LVDS Overview

The LVDS family of cells allows the implementation of links capable of the four operating speeds required by this invention: 622.08 Mb/s, 777.6 Mb/s, 2.48832 Gb/s, and 2.64384 Gb/s. These LVDS cells are also capable of supporting the 8B/10B mode of operation and the scrambled mode of operation. A reference clock of 155.52 MHz is required.

The 8B/10B mode of operation is described in the following paragraphs.

Ten-bit parallel data is sampled by the line rate divided-by-10 clock (77.76 MHz SYSCLK) and then serialized at the line rate on the LVDS output pins by a 777.6 MHz clock synthesized from SYSCLK. Serial line rate LVDS data is sampled and de-serialized to 10-bit parallel data. Parallel output transfers are synchronized to a gated line rate divided-by-10 clock. The 10-bit data is passed to an 8B/10B decoding block. The gating duty cycle is adjusted such that the throughput of the parallel interface equals the receive input data rate (Line Rate +/−100 ppm). It is expected that the clock source of the transmitter and the receiver are the same to ensure that the data throughput at both ends of the link are identical.

Data must contain sufficient transition density to allow reliable operation of the data recovery units. 8B/10B block coding and decoding is provided by the T8TE and R8TD and RSEF blocks.

The S-NRZ mode of operation can operate at three data rates: 622.08 Mb/s, 2.48832 Gb/s, and 2.64384 Gb/s, depending on the frequency provided by the clock generator.

Eight-bit parallel data is sampled by the line rate divided-by-8 clock and then serialized at the line rate on the LVDS output pins by a variable rate clock synthesized from SYSCLK. Serial line rate LVDS data is sampled and de-serialized to 8-bit parallel data. Parallel output transfers are synchronized to a gated line rate divided-by-8 clock. The 8-bit data is passed to a SONET/SDH A1/A2 framing block. The gating duty cycle is adjusted such that the throughput of the parallel interface equals the receive input data rate (Line Rate +/−100 ppm). It is expected that the clock source of the transmitter and the receiver the same to ensure that the data throughput at both ends of the link are identical.

At the system level, reliable operation will be obtained if proper signal integrity is maintained through the signal path and the receiver requirements are respected. Namely, a worst case eye opening of 0.7 UI and 100 mV differential amplitude is needed. These conditions should be achievable with a system architecture consisting of board traces, two sets of backplane connectors and up to 1 m of backplane interconnects. This assumes proper design of 100 Ω differential lines and minimization of discontinuities in the signal path. Due to power constraints, the output differential amplitude is approximately 350 mV.

Frame Alignment in a Multi-Device Environment

The RJ0FP frame pulse is used to synchronize a set of devices that are inter-connected via LVDS links. It is provided concurrently to all the devices in the system once every 125 µs, or multiples thereof. Characters retrieved from the receive LVDS links are written into a FIFO buffer. When the J0 character is received, it is written into a fixed location in the FIFO buffer. Subsequent characters are written into the locations following the foregoing fixed location. At each device in the system, a software configurable counter is used to mark the point, relative to RJOFP, where all its receive LVDS links are expected to have delivered their J0 character. As directed by the delay counter, the device will then read the fixed location where the J0 character is stored, thus synchronizing all the receive LVDS links. Differential delays between and clock instabilities of LVDS links are absorbed by the FIFOs.

The preferred embodiment provides a new use of 8B/10B control characters to label SONET/SDH transport frame, high-order path frame, and low-order path frame boundaries. The types of bytes that are encoded in 8B/10B control characters are configurable to suit different classes of SONET/SDH equipment (multiplex section terminators, high-order path terminators and low-order path terminators).

Furthermore, the use of 8B/10B encoding on de-scrambled SONET/SDH data streams in order ensures data transitions on the serial links and preserves DC balance.

The standard 8B/10B control character set is extended by treating the positive and negative running disparity codes of those control characters with an even number of ones and zeros as two separate control characters. The preferred embodiment doubles the number of control characters available for encoding of events. Further, DC balance is retained without having to alternately send positive and negative running disparity codes.

The use of FIFOs and a universal frame pulse with software programmable delay advantageously allows the transfer of a single SONET OC-N/SDH STM-M signal over multiple links.

The preferred embodiment also provides a transparent in-band error reporting facility where errors detected at the SONET/SDH receiver can be transferred to the transmitter to construct remote error and defect indication codes.

The occurrence of line code violations of 8B/10B characters can be used to monitor error performance of the serial links.

The preferred embodiment further provides for PRBS pattern insertion and monitoring thereby allowing datapath verification prior to injection of the actual payload.

In S-NRZ mode, the same mechanism for frame alignment in a multi-device environment applies, but frame alignment is found by SONET/SDH A1/A2 alignment instead of by 8B/10B codes. Once frame alignment is found, the receiver FIFO is managed in the identical manner.

The present bus interface has 2 modes. One mode is a scrambled STS-N mode while the other is an 8b10b encode mode. Both modes are used for intra-box communications and not over public networks. The receive module will operate with partially compliant SONET/SDH signal streams. Either SONET/SDH A1/A2 frame delineation to find byte and frame boundaries or 8b/10b coding to find byte boundaries and 8B/10B control characters to find frame boundaries can be used. The following table (Table I) shows which bytes within a partially compliant Sonet stream have to be valid in each of the two modes for the correct operation of the link. Bytes labeled "User Data" can have any value without affecting the operation of the link. Bytes labeled "Valid" must contain values defined by SONET. In contrast all the bytes listed in Table I must be .Valid. in a standard SONET link.

TABLE I

| OVERHEAD | SCRAMBLED | 8b/10b |
|---|---|---|
| A1 #1...#N − 3 | User Data | User Data |
| A1 #N − 2...#N | Valid = 'hF6 | User Data |
| A2 #1...#3 | Valid = 'h28 | User Data |
| A2 #4...#N | User Data | User Data |
| J0 | User Data | Replaced by K character |
| H1 | Valid | User Data |
| H2 | Valid | User Data |
| H3 | Valid | Replaced by K-character |
| PSO | Valid | Replaced by K-character |
| B1 | Valid | Valid |
| B2 | Valid | Valid |
| Other TOH | User Data | User Data |
| J1 | Valid | Replaced by K-character |
| H4 | Valid | Valid/User Data |
| Other HO-POH | User Data | User Data |
| V1 | Valid | Valid/User Data |
| V2 | Valid | Valid/User Data |
| V3 | Valid | Replaced by K-character |
| V4 | User Data | User Data |
| V5 | Valid | Replaced by K-character |
| Other LO-POH | User Data | User Data |
| Payload bytes | User Data | User Data |

Replacement of bytes labeled as "Replaced by K-character" are mode dependent (see FIGS. 2A and 2B). If not replaced, the byte is "Valid".

The above-described embodiments should be regarded as illustrative rather than restrictive, and it should be appreciated that variations may be made other than those discussed, by workers of ordinary skill in the art without departing from the scope of the present invention.

We claim:

1. An interface device for connecting SONET/SDH termination devices with payload processing devices, comprising:
   (a) a receive module receiving incoming partially compliant SONET/SDH signal streams, recovering bit boundaries, and recovering byte and frame alignment by using one of SONET/SDH A1/A2 frame delineation to find both byte and frame boundaries and 8B/10B coding to find byte boundaries and 8B/10B control characters to find frame boundaries; and
   (b) a transmit module having a single transmit data scrambler/encoder for scrambling an entire STS-N stream to serialize said partially compliant SONET/SDH signal streams, convert said partially compliant SONET/SDH signal streams into outgoing differential signal levels, and to transmit said partially compliant SONET/SDH signal streams.

2. An interface device for connecting SONET/SDH termination devices with payload processing devices, comprising:
   (a) a receive module receiving incoming partially compliant SONET/SDH signal streams, recovering bit boundaries, and recovering byte and frame alignment by using one of SONET/SDH A1/A2 frame delineation to find both byte and frame boundaries and 8B/10B OR coding to find byte boundaries and 8B/10B control characters to find frame boundaries; and (b) a transmit module having a single transmit data scrambler/encoder for scrambling an entire STS-N stream to serialize said partially compliant SONET/SDH signal streams, convert said partially compliant SONET/SDH signal streams into outgoing differential signal levels, and to transmit said partially compliant SONET/SDH streams, wherein said interface device supports 8B/10B encoding of STS-12 at 622.08 Mb/s producing an effective line rate of 717.6 Mb/s.

3. An interface device according to claim 2, wherein said interface device supports SONET scrambled coding for STS-12 at 622.08 Mb/s, STS-48 at 2488.32 Mb/s, and STS-51 at 2643.84 Mb/s.

4. An interface device according to claim 2, wherein said interface device is operative to test links by inserting and checking pseudo random bit sequences (PRBS).

5. An interface device according to claim 2 wherein said interface device is operative, with respect to a given link, to individually test a synchronous payload envelope of a largest concatenated STS-Nc carried by said link by inserting and checking pseudo random bit sequences.

6. An interface device according to claim 2, wherein said receive module comprises multiple receivers and said interface device is operative to find mutual frame alignment of partially compliant SONET/SDH frames on said receivers.

7. An interface device according to claim 6, wherein said interface device is operative to divide said receivers into groups which achieve separate mutual frame alignments.

8. An interface device according to claim 6, wherein said receivers allow mutually aligned incoming signals to have differential delay.

9. An interface device according to claim 8, wherein said receivers are operative to allow some signals to entirely skip space-switching stages, while other mutually aligned signals pass through said space-switching stages.

10. An interface device according to claim 2, wherein said interface device supports diagnostic line testing by inserting B1 framing errors at said transmit module and checking said B1 framing errors at said receive module.

11. An interface device according to claim 2, wherein said receive module comprises multiple receivers and said interface device is operative to find mutual frame alignment of partially compliant SONET/SDH frames on said receivers.

12. An interface device according to claim 11, wherein said interface device supports 8B/10B encoding of STS-12 at 622.08 Mb/s producing an effective line rate of 777.6 Mb/s.

13. An interface device according to claim 11, wherein said interface device supports SONET scrambled coding for STS-12 at 622.08 Mb/s, STS-48 at 2488.32 Mb/s, and STS-51 at 2643.84 Mb/s.

14. An interface device according to claim 11, wherein said interface device is operative to test links by inserting and checking pseudo random bit sequences.

15. An interface device according to claim 11, wherein said interface device is operative, with respect to a given link, to individually test a synchronous payload envelope of a largest concatenated STS-Nc carried by said link by inserting and checking pseudo random bit sequences.

16. An interface device according to claim 11, wherein said interface device is operative to divide said receivers into groups which achieve separate mutual frame alignments.

17. An interface device according to claim 11, wherein said receivers allow mutually aligned incoming signals to have differential delay.

18. An interface device according to claim 17, wherein said receivers are operative to allow some signals to entirely skip space-switching stages, while other mutually aligned signals pass through said space-switching stages.

19. An interface device according to claim 11, wherein said interface device supports diagnostic line testing by inserting B1 framing errors at said transmit module and checking said B1 framing errors at said receive module.

\* \* \* \* \*